United States Patent
Senshu

(10) Patent No.: US 6,172,947 B1
(45) Date of Patent: Jan. 9, 2001

(54) METHOD AND APPARATUS FOR TIME SHIFTED SIGNAL RECORDING AND REPRODUCTION

(75) Inventor: Susumu Senshu, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 08/955,335

(22) Filed: Oct. 21, 1997

(30) Foreign Application Priority Data

Oct. 23, 1996 (JP) ..................................................... 8-281109

(51) Int. Cl.[7] .............................. G11B 17/22; G11B 7/24
(52) U.S. Cl. ............................ 369/32; 369/59; 369/275.3
(58) Field of Search ................................ 369/32, 48, 54, 369/59, 100, 13, 58, 60, 275.3, 275.2, 47, 116, 110; 360/59

(56) References Cited

U.S. PATENT DOCUMENTS

| | | | |
|---|---|---|---|
| 5,109,373 | * 4/1992 | Ohno et al. ............................ | 369/100 |
| 5,343,456 | * 8/1994 | Maeda ..................................... | 369/59 |
| 5,388,105 | * 2/1995 | Takagi et al. ......................... | 714/758 |
| 5,517,471 | * 5/1996 | Ashinuma et al. .................... | 369/13 |
| 5,974,023 | * 11/1999 | Miyauchi et al. ................ | 369/275.3 |

* cited by examiner

Primary Examiner—Ali Neyzari
(74) Attorney, Agent, or Firm—Frommer, Lawrence & Haug, LLP; William S. Frommer

(57) ABSTRACT

An apparatus for recording and reproducing a data signal on and from a rewritable recording medium structured to have sectors and a method for recording the data signal on the recording medium are provided for enhancing endurance against the degrade of the recording medium caused by overwriting. The shift information for representing a shift amount of a recording start point is added to a VFO or a SYNC of the data. In recording, the recording start point is changed on the shift amount so as to avoid the overlap of the recording start location. In reproduction, the unnecessary portion of the recorded data is erased for preventing the VFO of the recorded data from being erroneously detected. By this operation, the apparatus and the method enhances the endurance against the repetitive overwrite of the data signal and secures extraction and synchronization of the reproduction clock.

3 Claims, 14 Drawing Sheets

US 6,172,947 B1

METHOD AND APPARATUS FOR TIME SHIFTED SIGNAL RECORDING AND REPRODUCTION

BACKGROUND OF THE INVENTION

1. Field of the Invention

The present invention relates to a method for recording a data signal containing a synchronous signal on a rewritable recording medium such as a phase-changing optical disk and an apparatus for recording and reproducing a data signal on and from the rewritable recording medium such as a phase-changing optical disk.

2. Description of the Related Art

There has been proposed a phase-changing optical disk as one of high-density recording mediums for repetitively rewriting data. The description will be oriented to the concrete technology of recording and reproducing a signal on and from this type of phase-changing optical disk.

FIG. 1 schematically illustrates a sector format of a data signal to be recorded on the phase-changing optical disk that is an example of a rewritable recording medium.

The data signal shown in FIG. 1 is recorded on sectors of an address area pre-formatted when manufacturing the optical disk. The address area contains the data indicating a physical address on the disk. When recording the data, the operation is executed to read the address signal recorded on this address area for accessing a target address and then to record the data signal formatted as shown in FIG. 1 on the timing based on the reproduction signal of the address area if the target address is reached.

In this data signal format, a predetermined continuous repetitive pattern called VFO is recorded at the head of the format. This VFO is a pattern on which the data signal can be reliably reproduced by varying an oscillation frequency of a phase locked loop (PLL) in reproducing the data signal. Hence, if the number of revolutions of the disk is variable, the data pattern allows the data signal to reliably be reproduced. The pattern contains many pieces of edge information, that is, short repetitive intervals, because the existence of many pieces of edge information is likely to execute the PLL pull-in operation with respect to this pattern.

An SYNC (synchronous pattern) following the VFO is a pattern used as a synchronous signal of the data area and utilizes a pattern that does not normally appear in the data. A DATA recorded after the SYNC indicates data containing data used by a user and additional information such as an ECC (error correcting code), control data, and RESYNC (resynchronous pattern).

FIG. 2 is a block diagram showing an example of a basic arrangement of a recording system provided in a general apparatus for recording and reproducing a signal.

In operation, when a pre-pit (pre-format) address pre-recorded and pre-formed on the disk is correctly detected, a timing generator 11 of a reproduction system operates to output an ID detection signal and initialize a timing generator 13 of a recording system. The recording system is controlled on various kinds of timings generated by the timing generator 13 so that the recording system can perform a recording operation according to a predetermined recording format.

Concretely, the timing generator 13 operates to supply various timing signals to a control unit (not shown), a selecting circuit 17, and a parallel/serial converter 18 and generate a recording gate (to be discussed below). This recording gate is a signal for limiting the recording range of the data on a time axis.

The selecting circuit 17 is inputted with the data from the control unit (not shown) through an interface unit 14 and with a SYNC pattern from a SYNC pattern generator 15 and a VFO pattern from a VFO pattern generator 16. The selecting circuit 17 operates to select one of these signals based on the timing signal sent from the timing generator 13 and supply it to the parallel/serial converter 18.

The parallel/serial converter 18 operates to parallel-to-serial convert the output from the selecting circuit 17 according to the output from the timing generator 13 and output the converted signal as recording data according to the format shown in FIG. 1.

The timing generator 11 of the reproduction system is inputted with the reproduction clock and the timing generator 13 of the recording system is inputted with the recording clock.

FIG. 3 is a block diagram showing an example of a basic arrangement of a reproduction system included in the conventional apparatus for recording and reproducing a signal, which corresponds to the recording system of the apparatus illustrated in FIG. 2. The components of FIG. 3 that are common to those of FIG. 2 have the same reference numbers as those of FIG. 2.

The reproduction system operates to detect any sector mark or a pre-pit address pre-recorded and pre-formed on a disk with an embossing technique for the purpose of predicting the location of the VFO or detect a reproduction RF signal for specifying the location of the VFO and to activate a phase-locked loop to pull the phase of the reproduction RF signal of the VFO. The timing generator of the reproducing system is initialized by detecting the pre-pit address (ID signal) pre-recorded and pre-formed on the disk and then is operated to predict the location of the SYNC and generate a SYNC detecting window signal. Then, if the SYNC is detected in the SYNC detecting window signal, the timing generator determines the synchronization is obtained and initializes the timing generator of the reproduction system for controlling the reproduction system. This timing generator of the reproduction system controls demodulation of data, serial/parallel conversion, interface with the control unit (not shown), and the like.

By detecting the reproduction RF signal, the location of the VFO is specified. Then, the PLL is activated for the reproduction RF signal of the VFO for detecting the SYNC after the VFO. Then, the detected SYNC pattern is used as a synchronous pattern.

In the operation of the reproduction system, when the PLL is locked to the VFO, the data is taken out of the reproduction RF signal for synchronous pull-in and data demodulation based on the detected SYNC. After the reproduction clock is extracted, the data reproduction is executed by using the reproduction clock.

Concretely, between when the reproduction is started and when the reproduction RF signal of the VFO is detected, the PLL is activated for the predetermined fixed pattern supplied from a fixed pattern generator 22 with, e.g., a crystal oscillator so that an internal clock is pre-oscillated at a frequency closing to a target.

When the reproduction RF signal of the VFO is detected, the PLL is activated for the reproduction RF signal for synchronously pulling the signal at fast speed. After the signal is pulled, it is effective to lower the gain of the PLL circuit, thereby reducing the possibility of unlocking the phase of the signal.

The reproduction RF signal read from the disk is subject to amplification and equalization through the effect of the RF reproducing unit 20. The processed signal is supplied to a RF detector 21 and a binary circuit 23.

The RF detector 21 operates to detect a RF reproduction signal of the VFO and supply the signal to the flip-flop 24 as a reset input. The binary circuit 23 operates to digitize the RF reproduction signal and supply it to a selecting circuit 25 and a data extracting unit 27.

The flip-flop 24 is inputted with the signal supplied from the RF detector 21 as a reset input and with the timing signal of the reproduction system supplied from the timing generator 13 of the recording system as a set input. When the RF detector 21 detects the reproduction RF signal, the flip-flop 24 is set. The output of the flip-flop 24 is supplied as a selecting signal to the selecting circuit 25.

The selecting circuit 25 is inputted with the output of a fixed pattern generator 22 and the output of the binary circuit 23. The selecting circuit 25 selects one of the inputs according to the selecting signal supplied from the flip-flop 24 and then supplies it to a PLL circuit 26.

The PLL circuit 26 operates to pull in the digitized RF reproduction signal supplied through the selecting circuit 25. The output of the PLL circuit 26 is served as a reproduction clock.

A data extracting unit 27 operates to extract the SYNC and the data area from the digitized RF reproduction signal supplied from the binary circuit 23 and then supply them to the SYNC detector 28 and a demodulator 29. The SYNC detector 28 operates to detect the SYNC from the RF reproduction signal supplied through the data extracting unit 27 and then supply it to an AND circuit 33.

The AND circuit 33 operates to generate an AND of the SYNC detected by the SYNC detector 28 and a SYNC detecting window supplied from the timing generator 13 of the recording system and then to supply the ANDed signal to the timing generator 11 of the reproduction system. The timing generator 11 is reset when the SYNC is correctly detected, that is, when the SYNC is detected in the SYNC detecting window.

The demodulator 29 operates to demodulate the RF reproduction signal supplied from the data extracting unit 27 and supply the demodulated output to the serial/parallel converter 31. The serial/parallel converter 31 operates to serial-to-parallel convert the demodulated RF reproduction signal and then supply it to a control unit (not shown) through the interface unit 32. In addition, the data extracting unit 27, the SYNC detector 28, the demodulator 29, and the serial/parallel converter 31 are inputted with the reproduction clock from the PLL circuit 26.

The aforementioned phase-changing optical disk is arranged to reversibly phase-change a recording material from an amorphous state to a crystalline state or vice versa for the purpose of recording and reproducing the digital data by using the difference of light reflectivity between these two states. Concretely, the focused laser beam is applied to a minute area of the recording material for heating the area so that the corresponding pits to the digital data to be recorded are formed on the minute area. In general, those pits are crystalline when the data is erased, while those pits are amorphous when the data is recorded. The phase change of the recording material is controlled by the power of the laser beam or the firing time of the beam.

It is known that this type of phase-changing optical disk is so degraded by thermal stress if the repetitive rewrite of data (overwrite) caused by heating with the laser beam that the endurance and the recording and reproducing characteristics are made lower. In particular, the recording start point of the data containing the phase pull-in pattern or the like is the same location inside of each sector of the disk, so that the repetitive rewrite of the same pattern results in degrading the disk.

In order to overcome this shortcoming, as disclosed in J-P-A-8-10489 (the Japanese Lying-open Hei 8-10489), there has been proposed a technology of changing the recording start point of the data at random.

The proposed invention is, however, arranged to simply overwrite on the recorded data the recording data whose recording start point is changed at random. Hence, in case the clock is extracted from the data for the phase pull-in when reproducing the recorded data, the phase pull-in may be executed for the recorded data. This may lead to an obstacle of taking reliable synchronization.

Herein, the description will be oriented to the conventional method for recording a signal in which the recording start point is shifted from a predetermined location at each recording operation.

FIG. 4 shows a recording timing (recording gate) appearing as the shift amount of the recording start point is changed from 0 (no shift) to 14.

The recording operation is executed in the range of those recording gates. According to the recording timing shown in FIG. 4, no change takes place in the width (time) of the recording gate if the shift amount of the recording start point is changed, while the overall recording gate is shifted on the time axis.

In the conventional method for recording a signal as shifting the recording start point, in general, the shift amount is selected at random when newly recording data, because it is impossible to grasp the shift amount of the recording start point about the data recorded in the past.

FIG. 5 shows an example of a basic arrangement of a recording system of the conventional apparatus for recording and reproducing a signal by using the recording timing on which the recording start point is shifted. This recording system has the substantially same arrangement as the conventional apparatus for recording and reproducing a signal as shown in FIG. 2, except that a recording start point shift timing generator 12 for determining a shift amount of the recording start point is located between the timing generator 11 of the reproduction system and the timing generator 13 of the recording system.

Concretely, the timing generator 11 of the reproduction system operates to generate an ID detection signal for initializing the timing generator 13 of the recording system when the pre-pit address pre-recorded and pre-formed on the disk is correctly detected and then supply the ID detection signal to the recording start point shift timing generator 12. The shift timing generator 12 operates to delay the ID detection signal by the time corresponding to the shift amount of the recording start point and then supply the delayed signal to the timing generator 13 of the recording system. The timing generator 13 of the recording system operates to generate various kinds of recording timing signals and recording gates.

A selecting circuit 17 is inputted with data from a control unit (not shown) through an interface unit 14 and with a SYNC pattern from a SYNC pattern generator 15 and a VFO pattern from a VFO pattern generator 16. Then, the selecting circuit 17 operates to select one of those signals based on the timing signal from the timing generator 13 of the recording system and then supply the selected signal to a parallel/serial converter 18.

The parallel/serial converter 18 operates to parallel-to-serial convert the output from the selecting circuit 17 into the output from the timing generator 13 of the recording system and then output the converted signal as the recording data according to the format shown in FIG. 1. By this operation, the overall recording gate is shifted on the time axis without changing the width of the recording gate and the recording start location on the disk is shifted accordingly.

FIG. 6 shows the state of the conventional data overwritten on the recorded data in the recording system shown in FIG. 5.

In the foregoing conventional method for recording a signal without shift of the recording start point, the data to be overwritten on the disk corresponds to the data starting from one VFO as shown in FIG. 1.

However, after the data is recorded at a shift amount=0, in case the data is sequentially overwritten in order of the shift amount=4 and a shift amount=10, the VFO 1 of the data previously recorded at the shift amount=0 and the VFO 2 of the data previously recorded at the shift amount=4 are left on the disk. Hence, the data actually recorded on the disk is started from each of VFO patterns as indicated in FIG. 6. For example, those VFO patterns contain a head of the VFO 1 recorded at the shift amount=0, a head of the VFO 2 recorded at the shift amount=4, and the VFO 3 recorded at the shift amount=10.

In reproducing the data overwritten at variable shift amounts, the location of the VFO may range from v1 to v2 shown in FIG. 6 depending on the shift amount used in recording the data. Hence, the PLL pull-in operating range for the range of the VFO is required to be widened. Likewise, the SYNC detecting window is also required to be widened from s1 to s2.

The data to be reproduced is VFO 3, SYNC 3 and DATA 3 overwritten at the latest operation. In the case of detecting the reproduction RF signal for specifying the location of the VFO and enabling the PLL to pull the RF reproduction signal of the VFO for extracting the reproduction clock, the PLL circuit may pull the VFO 1 and the VFO 2 and then lower the gain of the PLL circuit for reducing the possibility of unlocking the VFO 1 and the VFO 2. In this case, the PLL circuit has difficulty in doing a pull-in operation for the VFO 3 to be originally locked.

Further, the pattern for the SYNC is a pattern that can be detected easily and as correctly as possible. If the SYNC pattern pseudoly appears as a result of generating an error in the VFO pattern or the data, this SYNC pattern may be erroneously detected. The widening of the SYNC detecting window from s1 to s2 in correspondence with the shift of the recording start point is not preferable for increasing the probability of erroneously detecting the SYNC pattern.

SUMMARY OF THE INVENTION

It is therefore an object of the present invention to provide a method for recording a signal and an apparatus for recording and reproducing a signal on and from a rewritable optical disk which method and apparatus are arranged to prevent the recording start point of the data from being fixed on a specific location of the disk, that is, prevent only the specific location of the disk from being degraded, and reliably take synchronization in reproducing the signal.

In carrying out the object in a preferred mode, according to an aspect of the present invention, a method for recording a data signal containing a synchronous signal on a rewritable recording medium having sectors is characterized in shifting a recording start point of the data, erasing the overall data recorded up to the recording start point, and rewriting the fixed pattern.

This method is thus arranged to prevent the recording start point of the data from being fixed on a specific location on the disk and thereby protecting the specific location on the disk from being progressively degraded.

Further, when shifting the recording start point based on the shift information of the recording start point for indicating the shift amount of the start point, by erasing the unnecessary recorded data and overwriting the predetermined fixed pattern, it is possible to extract the clock from the RF reproduction signal when reproducing the signal and easily and positively execute the phase pull-in of the clock.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Hereafter, the description will be oriented to a method for recording a signal and an apparatus for recording and reproducing a signal according to an embodiment of the present invention with reference to the appended drawings.

Figure 7:
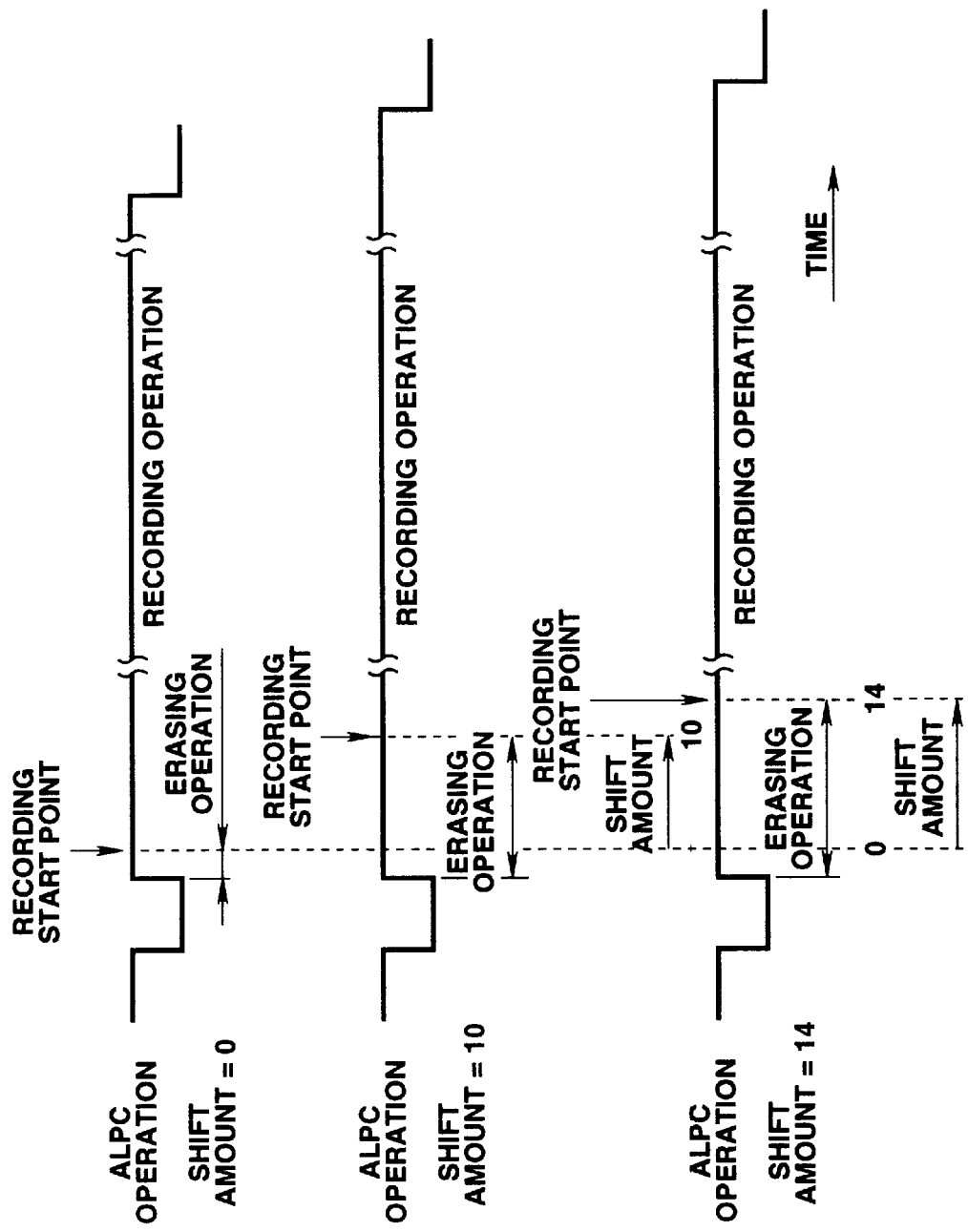
FIG. 7 is a view showing recording timings appearing in a method for recording a signal as shifting a recording start point from a given location according to an embodiment of the present invention.

FIG. 7 shows the recording timing appearing when the recording start point is shifted from a predetermined location by each amount of 0, 10 or 14 in the method for recording a signal according to the present invention.

This method is executed to shift the recording start point when recording (overwriting) a data signal as well as to erase the recorded data. In FIG. 7, the erasing operation is executed to erase an unnecessary portion of the recorded data, that is, the data recorded up to the recording start point.

Concretely, in the case of performing an ALPC (Automatic Laser Power Control) for controlling a power of a laser beam, the erasing operation is executed to erase the recorded data from the termination of the ALPC to the actual recording start point. Without performing an ALPC, the erasing operation is executed to erase the recorded data from a point before the recording start point in the case of a shift amount=0 to the actual writing location. That is, the erasing operation is executed to erase the data recorded on the portion that will not be used for data recording in the range of the shift amount of the recording start point from 0 to 14.

Figure 8:
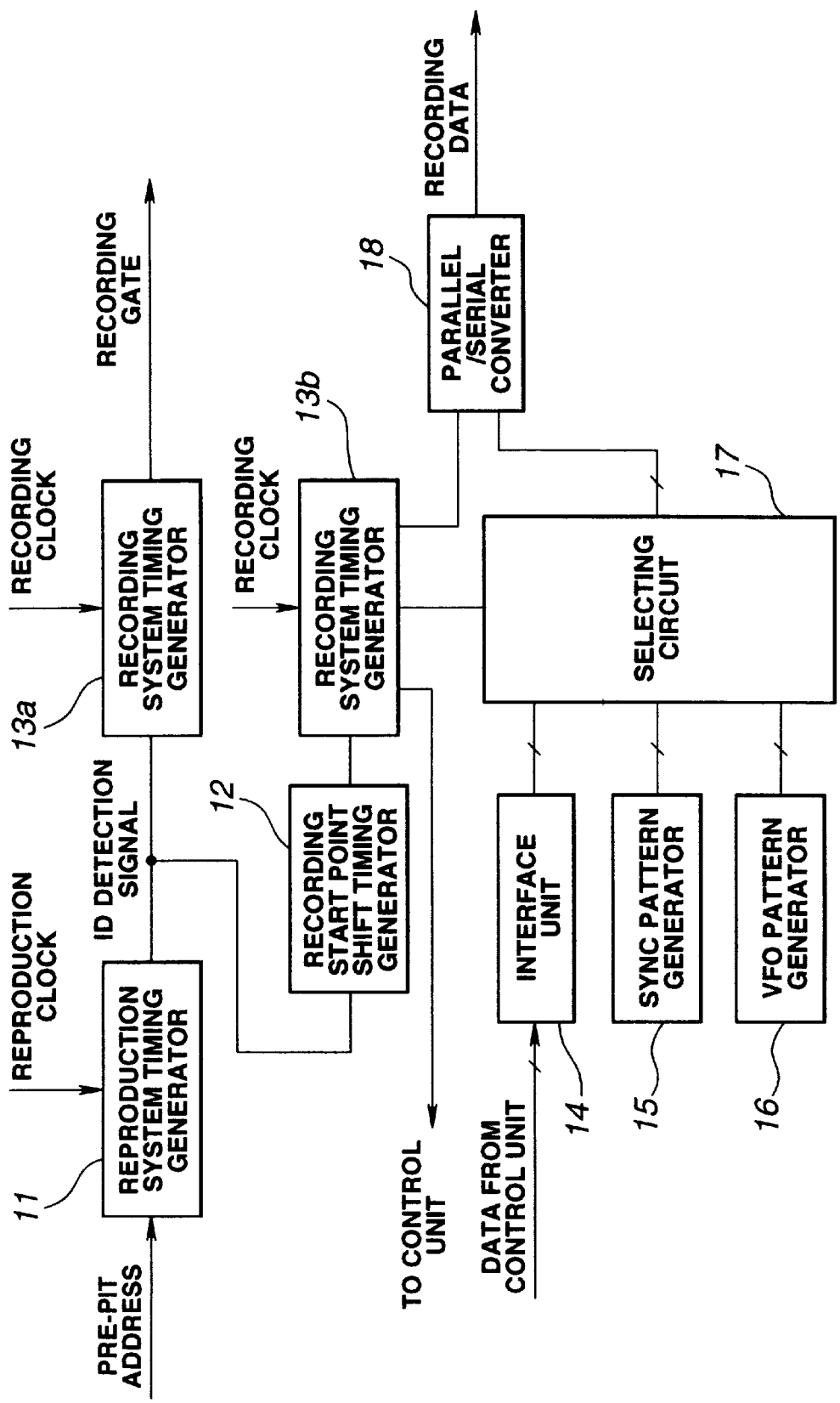
FIG. 8 is a block diagram showing a basic arrangement of a recording system of the apparatus for recording and reproducing a signal as shifting the recording start point according to the embodiment of the invention.

FIG. 8 is a block diagram showing a basic arrangement of a recording system of the apparatus for recording and reproducing a signal according to the present invention. This recording system operates to record data on the timing as shown in FIG. 7.

Figure 2:
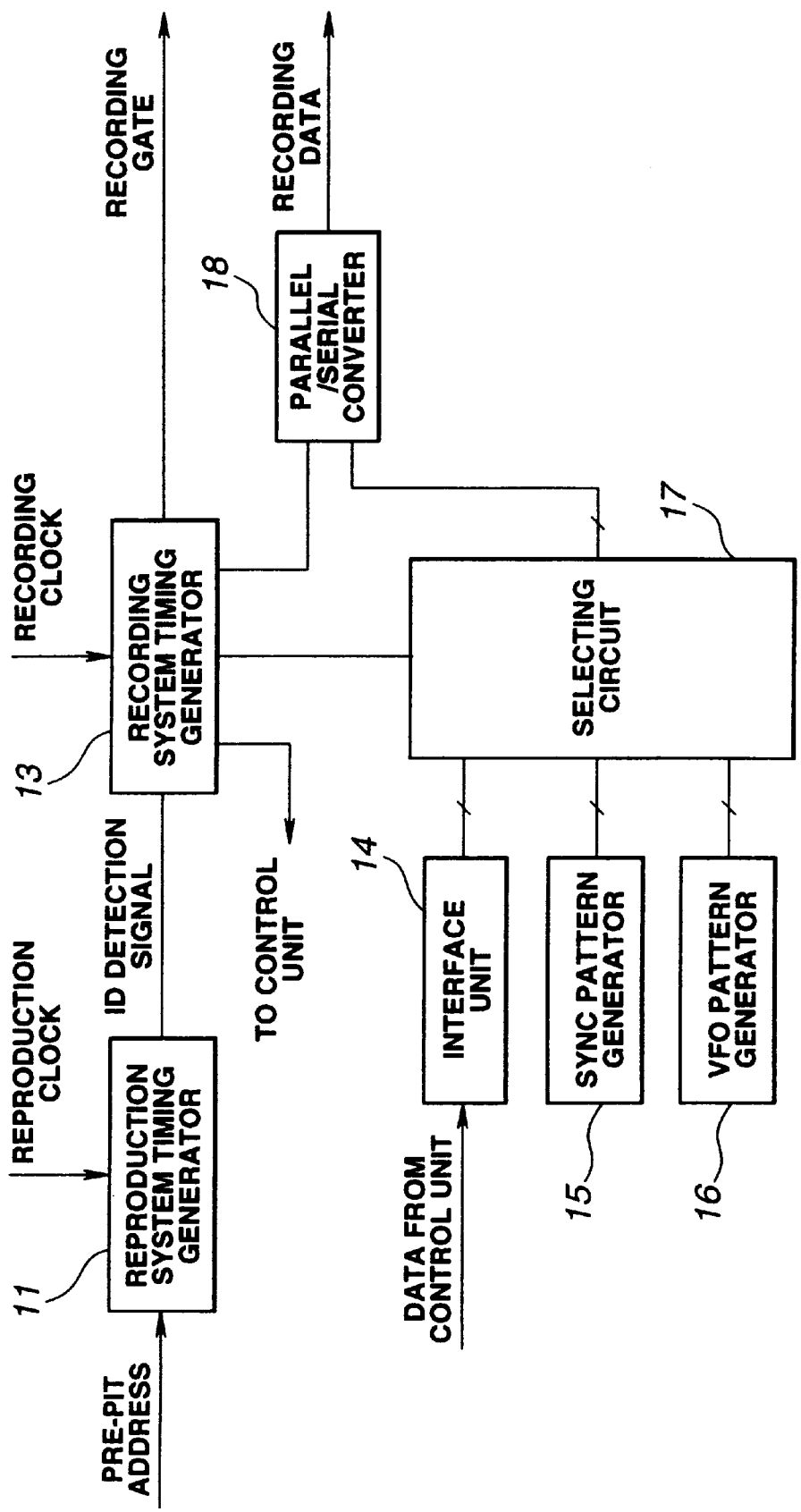
FIG. 2 is a block diagram showing a basic arrangement of a recording system of a conventional apparatus for recording and reproducing a signal.

The recording system shown in FIG. 8 is different from the recording system shown in FIG. 2 in that a timing generator 13 is divided into a timing generator 13a for generating a recording gate and a timing generator 13b for controlling recording data and a recording start point shift timing generator 12 is provided on the input side of the timing generator 13b. Concretely, the timing generator 13b operates to supply various kinds of timing signals to a control unit (not shown), a selecting circuit 17 and a parallel/serial converter 18 and generate the recording gate to be discussed below. The recording gate is a signal for limiting the recording range of the data on a time axis.

Figure 1:
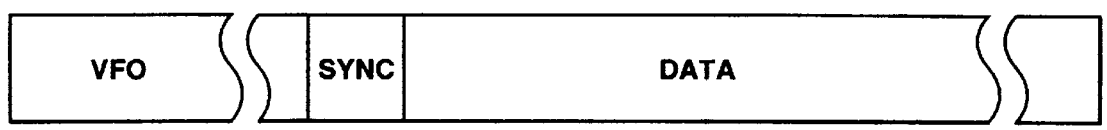
FIG. 1 is a schematic view showing a conventional sector format of the data recorded on an optical disk.

The selecting circuit 17 is inputted with the data from the control unit (not shown) through an interface unit 14, a SYNC pattern from a SYNC pattern generator 15, and a VFO pattern from a VFO pattern generator 16. The selecting circuit 17 selects one of these signals on the timing signal from the timing generator 13 and supplies the selected signal to the parallel/serial converter 18. The parallel/serial converter 18 operates to parallel-to-serial convert the output from the selecting circuit 17 according to the output from the timing generator 13b and output the converted data as the recording data formatted as shown in FIG. 1.

In addition, a reproduction system timing generator 11 is inputted with a reproduction clock. The recording system timing generators 13a and 13b are inputted with a recording clock.

The reproduction system timing generator 11 operates to generate an ID detection signal when a pre-pit address pre-recorded and pre-formed on a disk is correctly detected, output the ID detection signal to the recording system timing generator 13a for generating the recording gate, and then initialize the generator 13a. The reproduction system timing generator 11 operates to output the ID detection signal to the recording start point shift timing generator 12 as well. The shift timing generator 12 operates to delay the ID detection signal by a time corresponding to a shift amount of the recording start point and then supply the delayed signal to the recording system timing generator 13b. Then, the timing generator 13b operates to generate various kinds of timing signals for the recording system. That is, the recording system timing generator 13a is independent of the shift of the recording start point. Only the recording system timing generator 13b is subject to the shift of the recording start point controlled by the shift timing generator 12.

By this operation, the overall recording data is shifted on the time axis without changing a recording gate width, so that the recording start location is shifted on the disk. The recording gate generated by the timing generator 13a is controlled to have a gate width (time) that is long enough to cover the recording area of the data even if any shift amount of the recording start point is given to the data.

Figure 9:
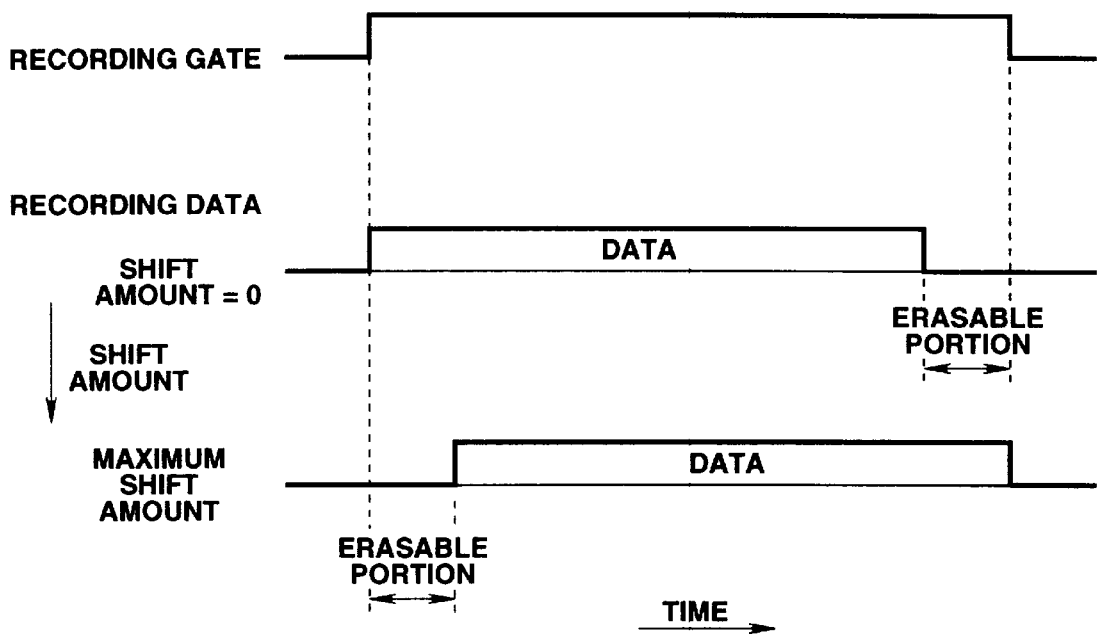
FIG. 9 is a view showing a timing relation between a recording gate and the recording data in the recording system of the apparatus for recording and reproducing a signal shown in FIG. 8.

FIG. 9 shows the timings of the recording gate and the recording data appearing when the recording system shown in FIG. 8 performs a recording operation. In the timings shown in FIG. 9, the recorded data before and after the recording data is erased on a recording medium.

As stated above, before recording the data, the recording start point of the data is shifted by an amount in the range of the recording gate with a constant width (time). Concretely, when the shift amount of the recording start point is equal to zero, the recording operation is executed from the head of the recording gate and the erasing operation is executed on the portion where no recording data exists. When the shift amount of the recording start point is maximum, the erasing operation is executed between the head of the recording gate and the head of the recording data so that the end of the recording data matches to the end of the recording gate.

Figure 6:
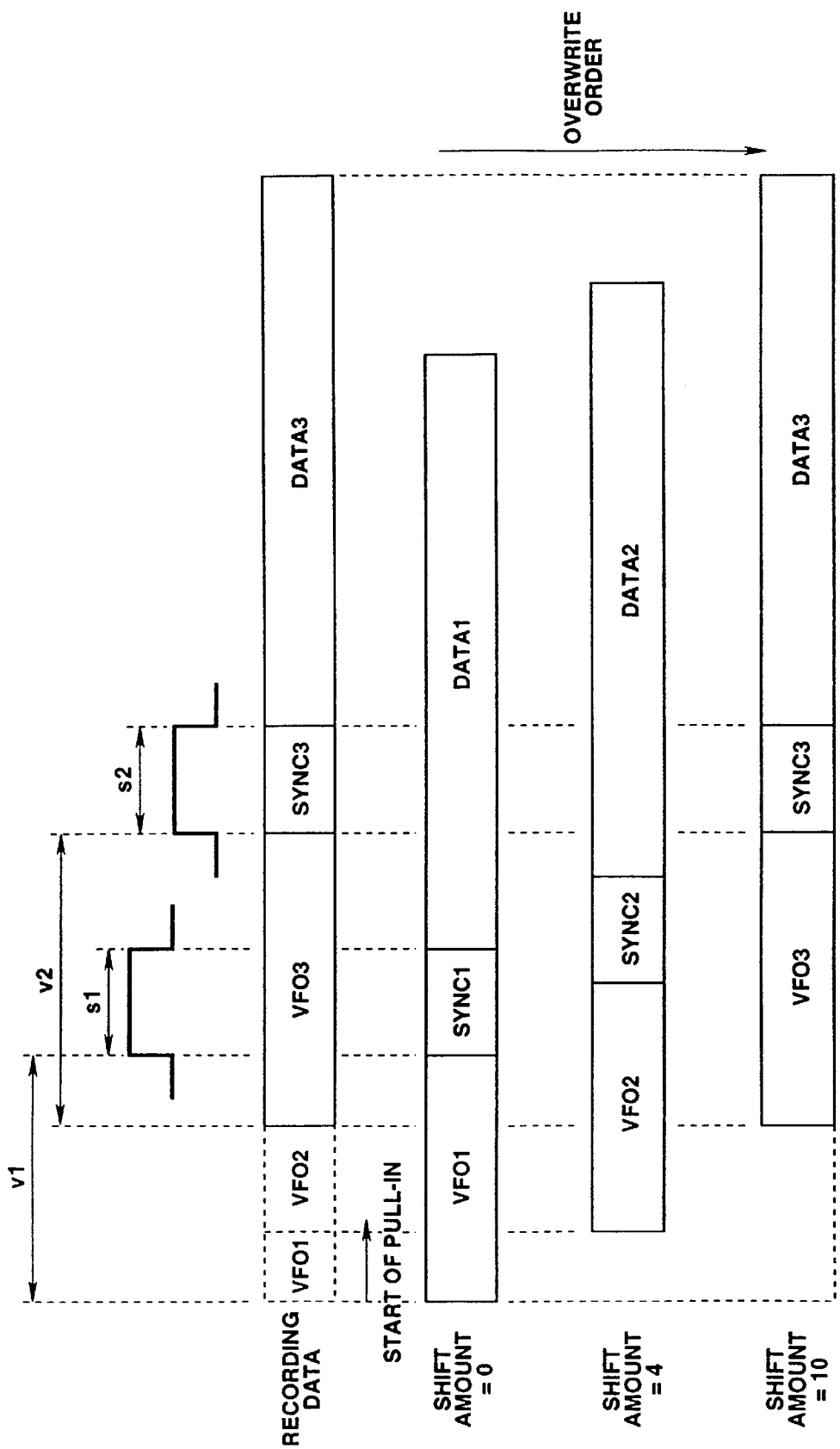
FIG. 6 is a view showing a state of the conventional data overwritten on the recorded data.
Figure 10:
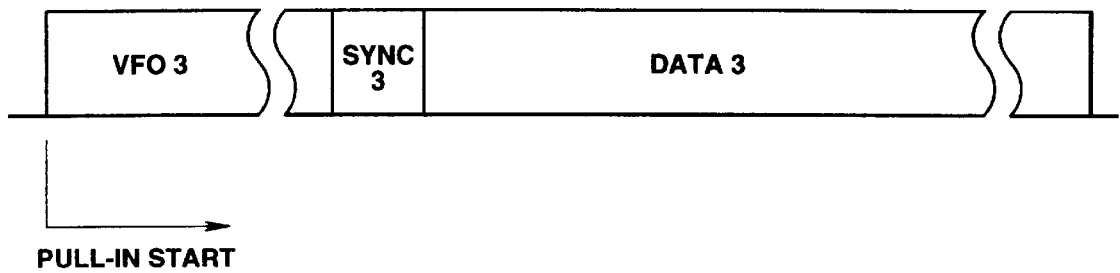
FIG. 10 is a view showing a state of data recorded on the disk through the method for recording a signal according to an embodiment of the present invention.

FIG. 10 shows the format of the data recorded on the disk by the recording system shown in FIG. 8. In FIG. 10, like FIG. 1, the recording data signal is composed of VFO, SYNC and DATA ranged from the head in sequence. The unnecessary portion of the disk except the portion where the recording data signal is recorded, that is, the overall data recorded up to the recording start point is erased. That is, in FIG. 10, unlike the state of the data according to the conventional signal recording method as shown in FIG. 6, which contains the unnecessary portion of the recorded data, no unnecessary recorded data of VFO 1 and VFO 2 is provided. In reproduction, therefore, the operation is executed to detect a RF signal for specifying the location of the VFO. Then, the PLL is activated for the RF reproduction signal of the VFO so that the PLL can reliably pull the VFO 3 when extracting the reproduction clock.

In turn, the description will be oriented to a method for recording a signal and an apparatus for recording and reproducing a signal to which the method is applied according to a second preferred embodiment of the present invention.

As described above, the conventional signal recording method with no shift of a recording start point is executed to predict a location of the VFO from a sector mark or an address of a pre-pit pre-recorded and pre-formed on the disk. Further, the conventional signal recording method for activating the PLL for pulling the VFO pattern on the disk is executed to erroneously detect the reproduction RF signal for the VFO pattern from the area except the VFO area contained in the recording data and enable the PLL to pull the erroneously detected reproduction RF signal. This erroneous detection is caused by defects and noises on the disk, for example.

However, the pull-in range of the PLL is required to be so wide as to correspond to the range where the VFO may be located. This is not preferable because the adverse effect of the defects or noises results in increasing the possibility of doing the pull-in operation about the erroneously detected data rather than the original VFO area.

In such a case, it is effective to record the recording start point shift information representing the shift amount of the recording start point at the head of the VFO area, for example.

Figure 11:
FIG. 11 is a schematic view showing a data format on which shift information of a recording start point (no. of shift) is added to a VFO of the recorded data.

FIG. 11 schematically shows the format at which the shift information (no. of shift) of the recording start point is added to the VFO of the recording data. In FIG. 11, the shift information (no. of shift) of the recording start point is located at the head of the VFO.

Figure 12:
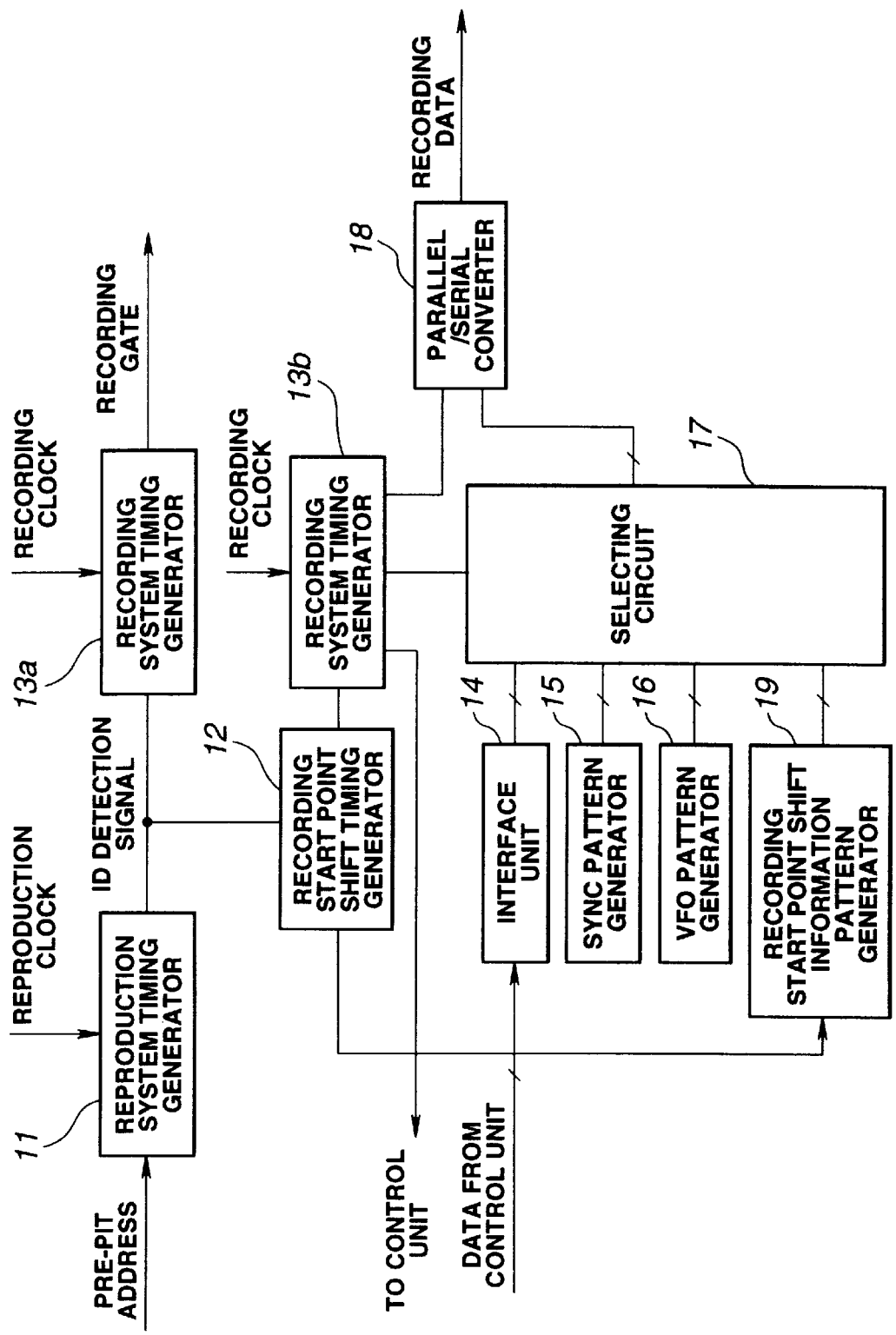
FIG. 12 is a block diagram showing a basic arrangement of a recording system for recording data recorded on the format shown in FIG. 11.

FIG. 12 shows a basic arrangement of the recording system of the apparatus for recording and reproducing a data signal containing the shift information (no. of shift) of the recording start point added to the VFO.

The recording system shown in FIG. 12 has the substantially same arrangement as the basic arrangement of the recording system shown in FIG. 8 except that a recording start point shift information pattern generator 19 is provided for generating a recording start point shift information pattern based on a timing signal supplied from the recording start point shift timing generator 12 and then the generator 19 supplies the generated pattern to the selecting circuit 17.

Concretely, in recording, the pattern generator 19 is inputted with a timing signal from a recording start point shift timing generator 12, generates the recording start point shift information pattern based on the timing signal, and then supplies the pattern to the selecting circuit 17. Under the control of the recording timing generator 13b, the recording start point shift information pattern is recorded on the disk at a format shown in FIG. 10.

On the other hand, at the start of the reproduction, since no clock is extracted from the reproduced data, what is required is to just record a rough shift amount with a signal (flag)

When the reproduction RF signal is detected for specifying the VFO area, it is checked if the recording start point shift information pattern is correctly reproduced. Further, it is checked if the reproduced recording start point shift information (no. of shift) coincides with the actually detected recording start point on the disk. Then, if it is checked that the shift information (no. of shift) of the recording start point is correctly reproduced and the reproduced shift information coincides with the actually detected recording start point on the disk, it is determined that the detected VFO area is associated with the target data. The detected VFO pattern is pulled by the PLL.

Figure 13:
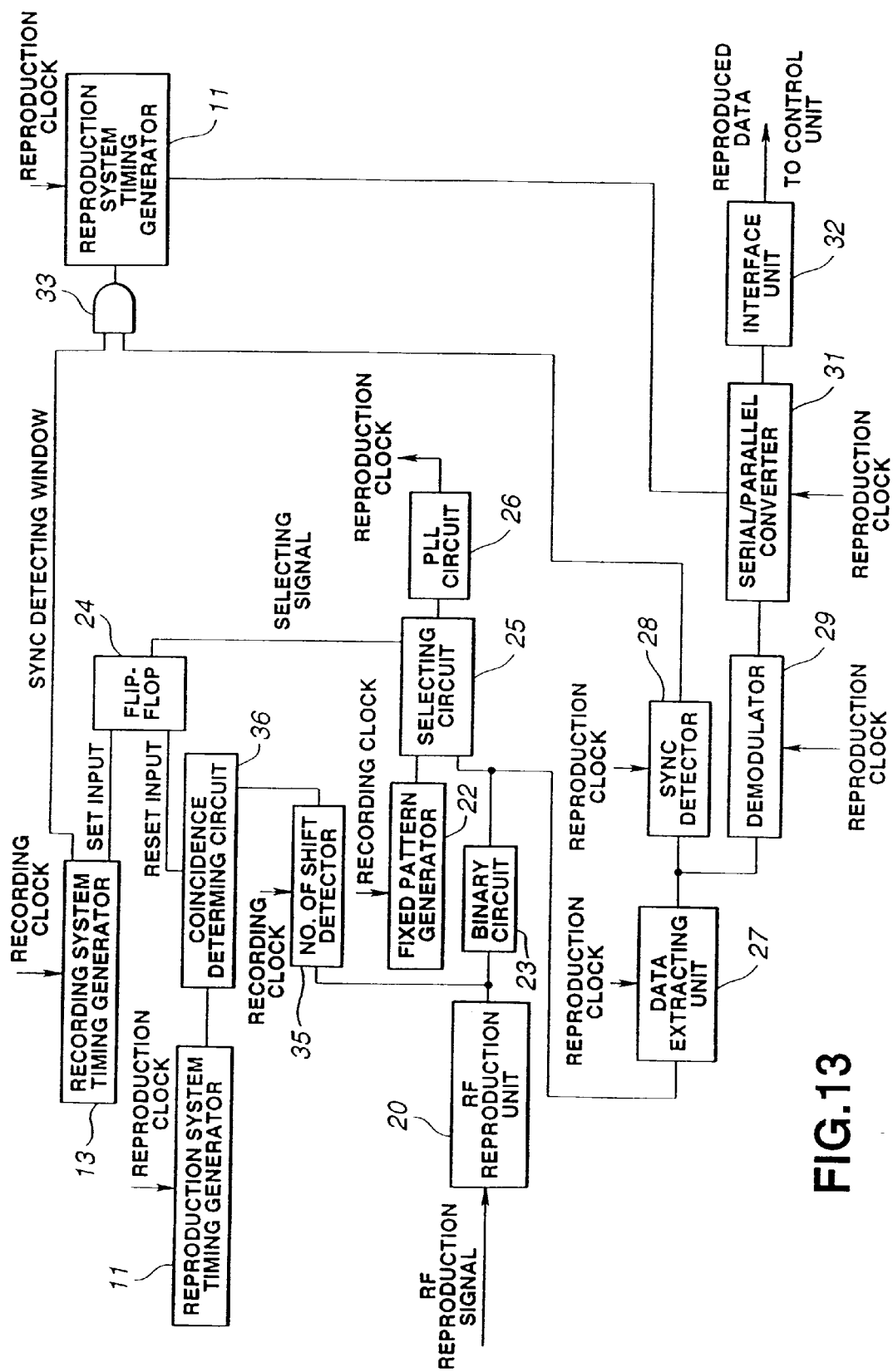
FIG. 13 is a block diagram showing a basic arrangement of a reproduction system corresponding to the recording system shown in FIG. 12.

FIG. 13 is a block diagram showing a basic arrangement of the reproduction system corresponding to the recording system shown in FIG. 12.

Figure 3:
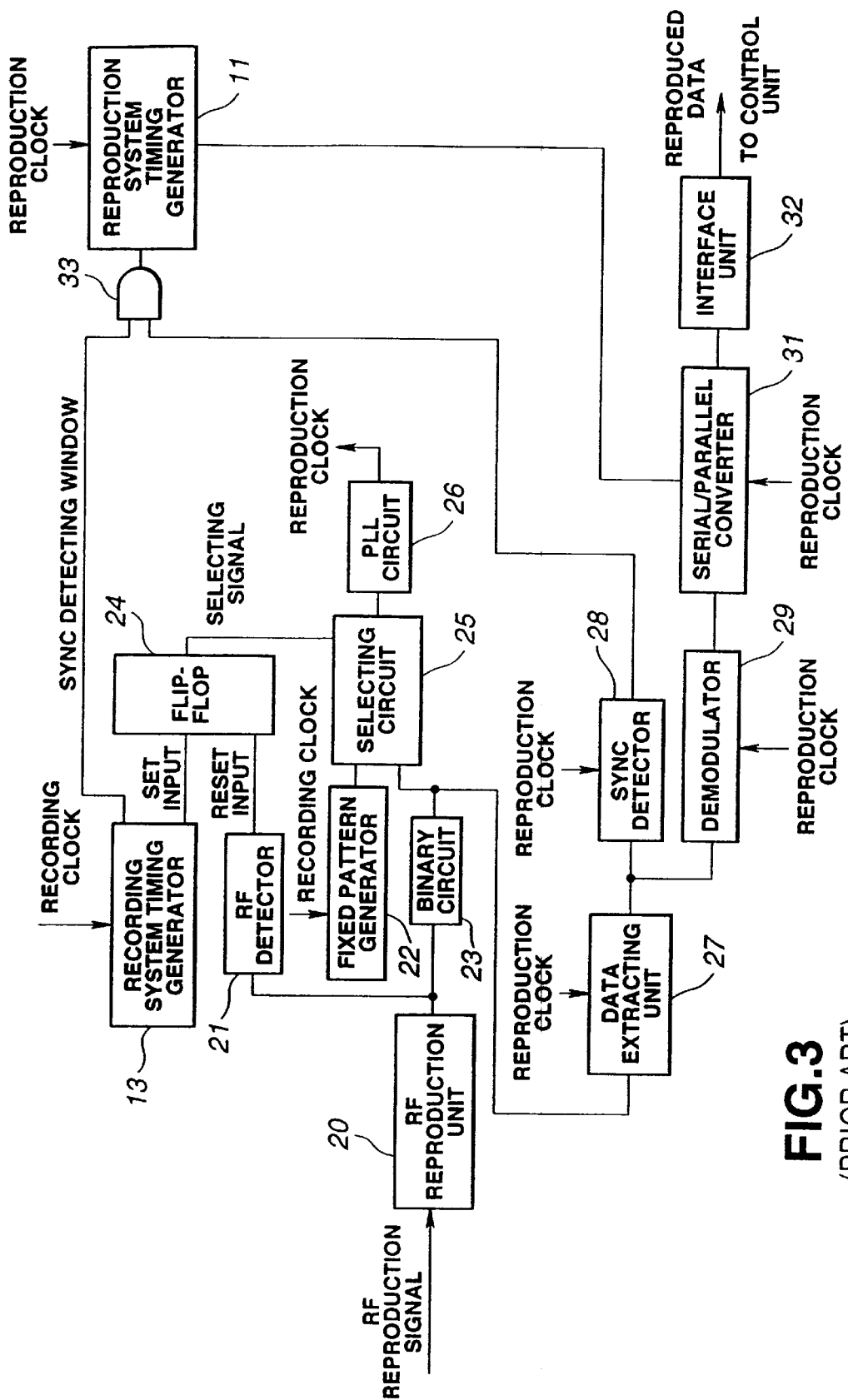
FIG. 3 is a block diagram showing a basic arrangement of a reproduction system of the conventional apparatus for recording and reproducing a signal.
Figure 4:
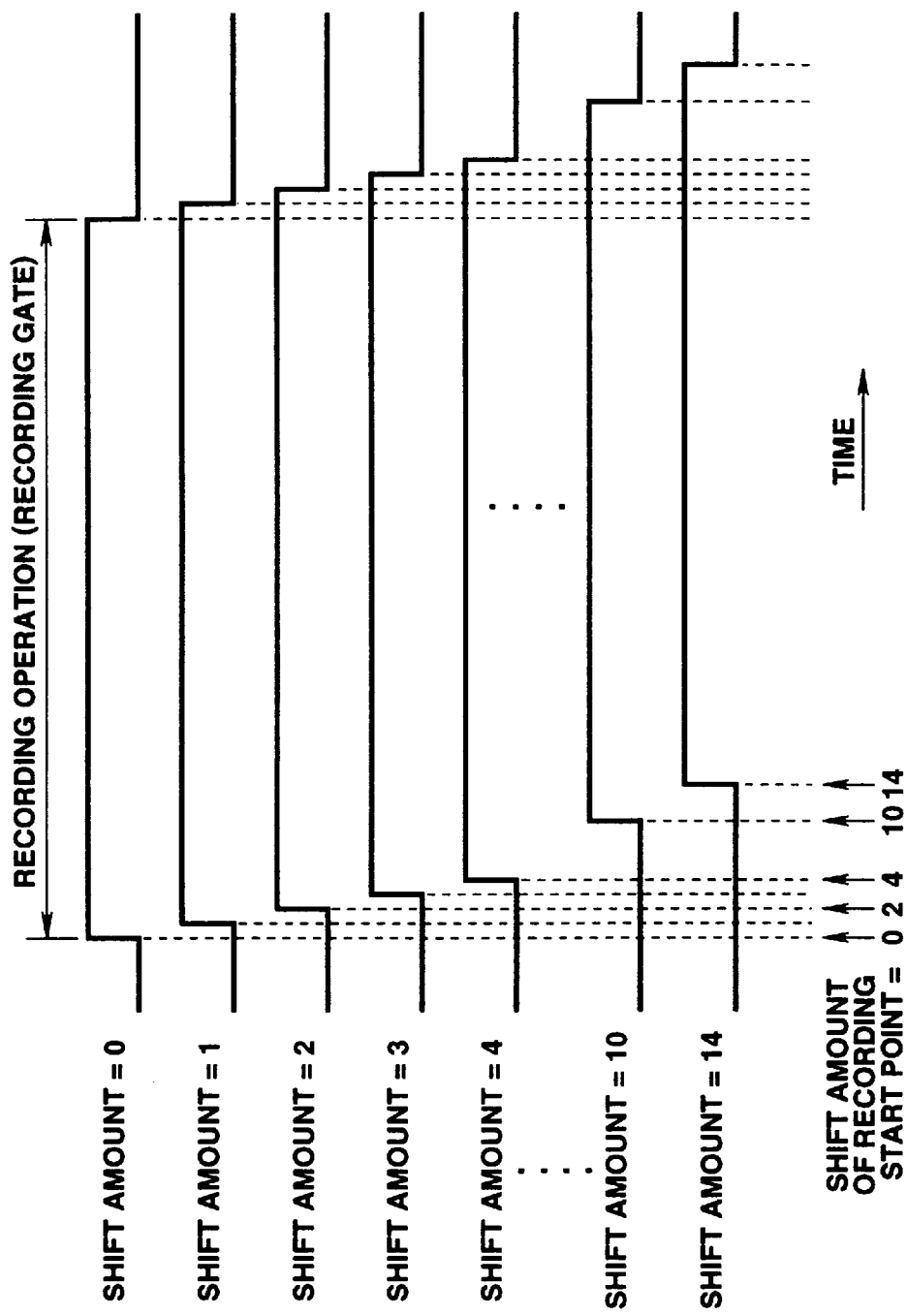
FIG. 4 is a view showing recording timings for shift amounts of a recording start point changing from 0 to 14.
Figure 5:
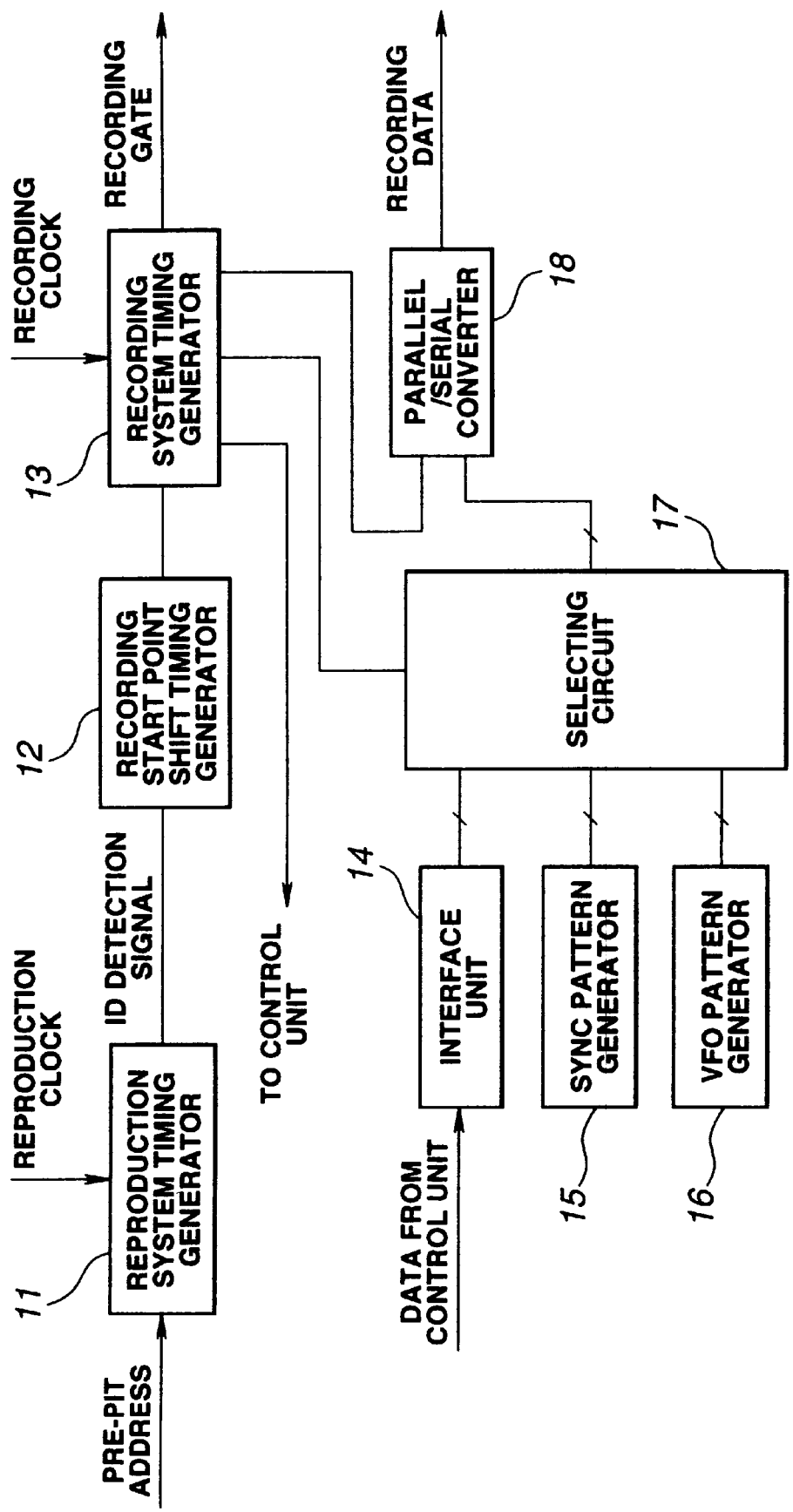
FIG. 5 is a block diagram showing a basic arrangement of a recording system of a conventional apparatus for recording and reproducing a signal as shifting a recording start point.

In place of the RF detector 21 of the conventional reproduction system shown in FIG. 3, the reproduction system provides a recording start point shift information detecting circuit 35 and a coincidence determining circuit 36 for determining if the reproduced shift information coincides with the actually detected recording start point on the disk. In the reproduction system, concretely, the PLL is activated for pulling a predetermined fixed pattern supplied from a fixed pattern generator 22 provided with a crystal oscillator, for example, between the start of the reproducing operation and the detection of the RF reproduction signal of the VFO portion. As a result, an internal clock is pre-oscillated at a frequency closing to a target one.

If the RF reproduction signal of the VFO is detected, the PLL is activated for synchronously pulling the RF reproduction signal at fast speed. After the PLL pull-in of the signal, it is effective to lower the gain of the PLL circuit for reducing the possibility of unlocking the phase of the signal.

The RF reproduction signal read from the disk is amplified or equalized by a RF reproducing unit 20 and then is supplied to a recording start point shift information detecting circuit 35 and a binary circuit 23.

The recording start point shift information detecting circuit 35 operates to detect the RF reproduction signal of the VFO having the shift amount (no. of shift) of the recording start point added thereto and supply it to the coincidence determining circuit 36.

The coincidence determining circuit 36 determines if the shift amount for representing the detected shift information (no. of shift) of the recording start point coincides with the reproduction timing signal supplied from the reproduction system timing generator 11, that is, the actually detected recording start point. Then, the determined result is inputted to a flip-flop 24 as its reset input.

The binary circuit 23 operates to digitize the RF reproduction signal and then supply the digitized signal to the selecting circuit 25 and a data extracting unit 27.

The flip-flop 24 uses the signal supplied from the coincidence determining circuit 36 as a reset input and the reproduction system timing signal supplied from the recording system timing generator 13 as a set input. The output of the flip-flop 24 is supplied as a selecting signal to the selecting circuit 25.

The selecting circuit 25 is inputted with the output of the fixed pattern generator 22 and the output of the binary circuit 23. The selecting circuit 25 operates to select one of the inputs according to the selecting signal supplied from the flip-flop 24 and supply it to the PLL circuit 26.

The PLL circuit 26 operates to pull the digitized RF reproduction signal supplied through the selecting circuit 25. The output of the PLL circuit 26 is served as the reproduction clock.

The data extracting unit 27 operates to extract the SYNC and the data area from the digitized RF reproduction signal supplied from the binary circuit 23 and then supply them to a SYNC detector 28 and a demodulator 29.

The SYNC detector 28 detects the RF reproduction signal supplied through the data extracting unit 27 and supplies it to an AND circuit 33.

The AND circuit 33 takes a logical product (AND) of the SYNC detected by the SYNC detector 28 and the SYNC detecting window supplied from the recording system timing generator 13. Then, the AND circuit 33 supplies the AND value to the reproduction system timing generator 11.

The reproduction system timing generator is reset when the SYNC is correctly detected, that is, when the SYNC is detected in the SYNC detecting window.

The demodulator 29 operates to demodulate the RF reproduction signal supplied from the data extracting unit 27 and supply the demodulated output to the serial/parallel converter 31.

The serial/parallel converter 31 operates to serial-to-parallel convert the demodulated RF reproduction signal according to the timing signal supplied from the reproduction timing generator 11. Then, the converted signal is supplied to the control unit (not shown) through the interface unit 32.

The data extracting unit 27, the SYNC detector 28, the demodulator 29, and the serial/parallel converter 31 are inputted with the reproduction clock from the PLL circuit 26.

In the reproduction system shown in FIG. 13, as stated above, the recording start point shift information detecting circuit 35 operates to detect the RF reproduction signal of the VFO having the shift information (no. of shift) of the recording start point added thereto and then supply it to the coincidence determining circuit 36. The coincidence determining circuit 36 determines if the shift amount for representing the detected shift amount (no. of shift) of the recording start point coincides with the reproduction timing signal supplied from the reproduction system timing generator 11, that is, the actually detected recording start point. The determined result is supplied to the flip-flop 24 as a reset input.

Until the RF reproduction signal of the VFO is detected, the PLL is activated for pulling a fixed pattern internally generated by the crystal oscillator so that a clock is pre-oscillated at a frequency closing to the target one. If it is determined that the shift amount for representing the detected shift amount (no. of shift) of the recording start point coincides with the actually detected recording start point, the selecting circuit 25 operates to select the clock on the output from the flip-flop 24 so that the PLL is activated for synchronously pulling the RF reproduction signal at high speed. After the PLL pull-in of the signal, it is effective to lower the gain of the PLL circuit for reducing the possibility of unlocking the phase of the signal. In a later process than the above, the reproduction system processes the data with the extracted reproduction clock.

In turn, the description will be oriented to the method for recording a signal and the apparatus for recording and reproducing a signal to which the method is applied according to a third preferred embodiment of the present invention.

As mentioned above, the SYNC pattern employs a unique pattern that can be easily detected but is far from erroneous detection. In case the SYNC pattern pseudoly appears because of an error caused in the VFO pattern or the data, the pseudo SYNC pattern may be erroneously detected. It is not preferable to widen the SYNC detecting window from sl to s2 in correspondence with the shift of the recording start point, because the widening resulting in increasing the probability of the erroneous detection.

In such a case, it is effective to record the shift information (no. of shift) of the recording start point after the SYNC.

Figure 14:
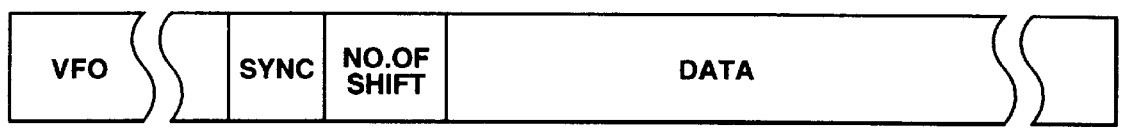
FIG. 14 is a schematic view showing a data format on which shift information of a recording start point (no. of shift) is added after a SYNC.

FIG. 14 schematically shows the format at which the shift information (no. of shift) of the recording start point is added after the SYNC.

The shift amount to be recorded on the shift information (no. of shift) of the recording start point is just needed to be precisely recorded according to the same modulating system as the system for the data, because the detection of the SYNC and the extraction of the reproduction clock have been already finished.

The recording system of the apparatus for recording and reproducing recording data having the shift information (no. of shift) of the recording start point added to the VFO may take the basic arrangement shown in FIG. 12. However, as stated above, the recording system takes the different method for generating the shift information of the recording start point from the system shown in FIG. 12. The recording system timing generator 13b for the data operates to record the shift information according to the predetermined format.

Figure 15:
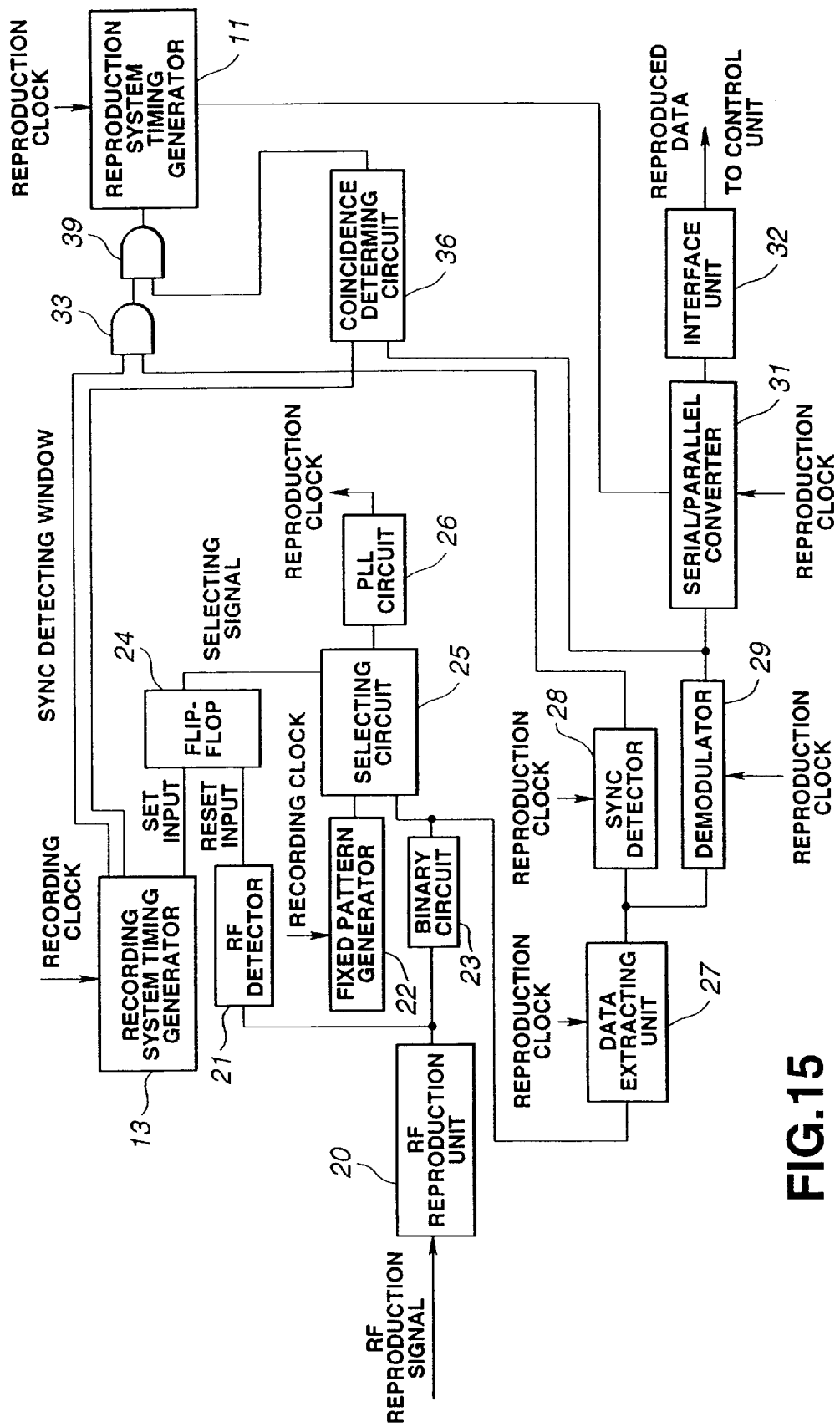
FIG. 15 is a block diagram showing a basic arrangement of the reproduction system of the apparatus for recording and reproducing a data signal recorded on the format shown in FIG. 14.

FIG. 15 is a block diagram showing a basic arrangement of the reproduction system provided in the apparatus for recording and reproducing recording data having the shift information (no. of shift) of the recording start point added to the VFO.

In the reproduction system, between the AND circuit 33 of the reproduction system shown in FIG. 13 and the reproduction system timing generator 11 for the data, a coincidence determining circuit 36 and an AND circuit 39 are provided. The coincidence determining circuit 36 operates to determine if the reproduced SYNC coincides with the actually detected reproduction clock based on the timing signal supplied from the recording system timing generator 13. The AND circuit 39 is initialized by the output of the coincidence determining circuit 36 after the SYNC is detected.

Concretely, the SYNC detector 28 detects the SYNC from the RF reproduction signal supplied through the data extracting unit 27 and then supplies the SYNC to the AND circuit 33.

The AND circuit 33 generates a logical product (AND) of the detected SYNC and the SYNC detecting window supplied from the recording system timing generator 13 and supplies the AND value to one input of the AND circuit 39.

The coincidence determining circuit 36 operates to determine if the timing signal supplied from the recording system timing generator 13, that is, the clock having the original recorded timing coincides with the reproduction clock extracted from the data. The determined result is inputted to the other input of the AND circuit 39.

The AND circuit 39 generates a logical product (AND) of the logical product of the detected SYNC and the SYNC detecting window supplied from the timing generator 13 and the logical product of the recording timing signal and the demodulated output of the data and then supplies the logical product to the reproduction system timing generator 11. Then, the timing generator 11 is reset by this logical product, that is, when the SYNC is detected at a proper location and when the precise reproduction clock is extracted from the data.

By this operation, the synchronous detection can be reliably realized even by widening the width of the SYNC detecting window signal by the distance corresponding to the shift amount of the recording start point.

The foregoing embodiments have been expanded along the phase-changing optical disk. However, the application of the present invention is not limited to the phase-changing optical disk but any kind of recording medium if it is rewritable by repetitive heating. In particular, the invention is preferable to a magneto-optical disk for erasing and rewriting data by heating with a laser beam.

As set forth above, the method for recording a signal according to the present invention is arranged to control the data recording start point on the disk to be shifted from the recording start point of the recorded data, based on the shift information of the recording start point for representing the shift amount of the recording start point. This control makes it possible to improve endurance of the disk against the laser heating. The method is also controlled to erase the unnecessary portion of the recorded data or overwrite the fixed pattern so that the synchronous signal can be reliably detected for allowing the quick PLL pull-in.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for recording a data signal on a rewritable recording medium structured to have sectors, said data signal containing a VFO signal portion and a synchronous signal portion and commencing with said VFO signal portion comprising the steps of:

writing said VFO signal portion on said rewritable recording medium from a predetermined start point on each sector to a new recording start point on said sector;

writing said data signal starting at said new recording start point; thereby shifting the start point for recording said data signal on said medium; said VFO signal portion and said data signal being written at a same frequency so that both are in phase; and wherein shift information of the start point is recorded in a predetermined area of said data signal.

2. An apparatus for recording and reproducing a data signal containing a synchronous signal on a rewritable recording medium structured to have sectors, comprising:

means for shifting a recording start point of said data signal;

means for recording shift information of said recording start point given by said shifting means on said recording medium together with said data signal;

means for reproducing said data signal recorded on said recording medium;

means for detecting said shift information of said recording start point from a reproduction signal sent from said reproducing means; and means for synchronously locking said reproduction signal based on said shift information of said recording start point detected by said detecting means.

3. The apparatus as claimed in claim 2, wherein said shift information of said recording start point is recorded on a VFO area of said data signal or after a synchronous pattern of a data area.

* * * * *